7016X
B. P. Coston,
Washing Machine.
Patented Apr. 27, 1832.
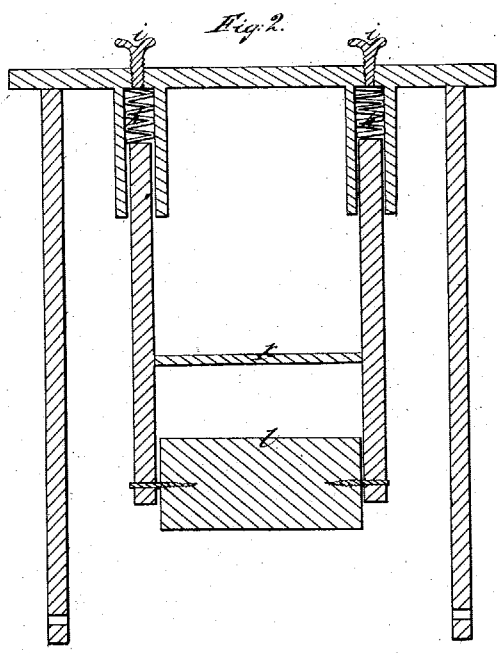
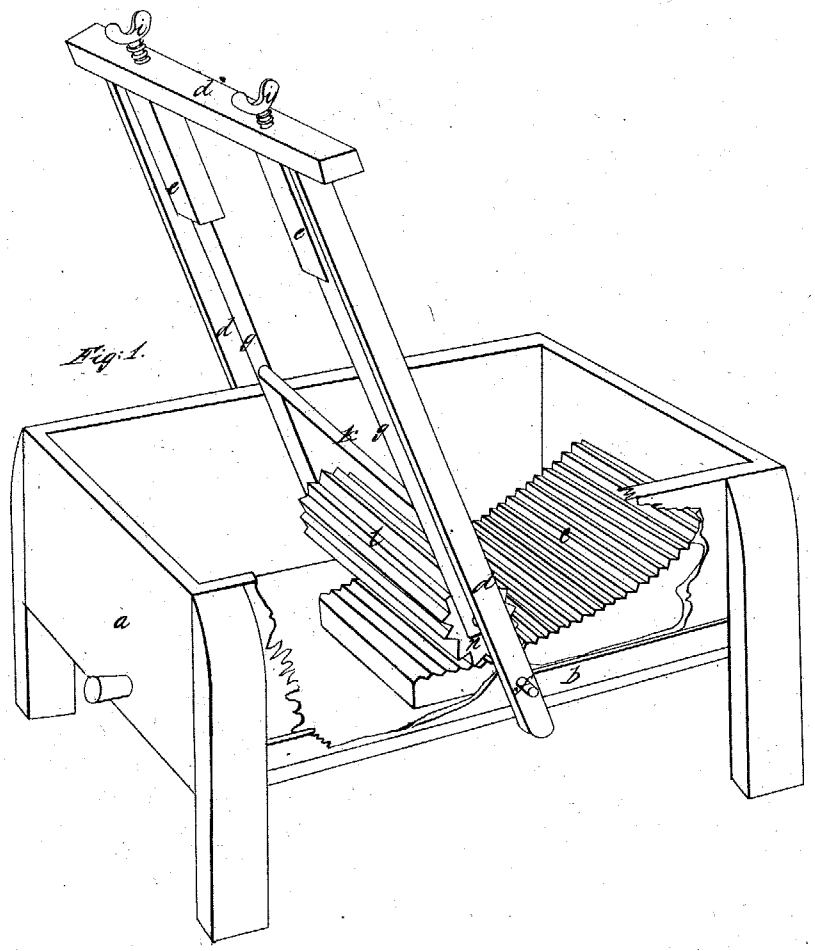
N. PETERS, PHOTO-LITHOGRAPHER, WASHINGTON, D. C.

7016X · apl 27, 1832 629

Benton P Coston of the City of Philadelphia Pennsylvania

The Schedule referred to in these Letters Patent and making part
of the same, containing a Description in the words of the said Benton
P Coston himself of his Improvement in the Machine for Washing
Clothes Be it Known that I Benton P Coston of the City &
County of Philadelphia, and State of Pennsylvania, have made
an improvement in the Machine for Washing Clothes, which
is described as follows, Make a box of any convenient size
& dimensions, water tight, and placed on four legs, of a convenient
height; this box is to contain the water, clothes, fluted washboard,
and fluted roller. Two bars are placed one on each side of the
Machine near the bottom. The fluted wash board, is about two
thirds of the length and one half, the width of the trough, made
of hard wood of a curved inclined shape, the ribs or flutes, are about
5. eighths of an inch apart. A swinging frame with a cylindri-
-cal ribbed or fluted roller; is made to work on the ribbed or flu-
ted washboard. The frame consists of two arms about 3½ feet
long, extending over the sides of the machine having a top rail
equal to the whole width of the machine. Two hanging arms
about 12 inches long, are suspended from this head or top rail,
for receiving the fluted cylinder & Springs to be next described.
The swinging frame turns on pins or Screws fixed in the lower
bars before mentioned. The fluted roller is made of a length
equal to the width of the wash board. A coiled, Spiral, or other
Spring is placed over two rods which are put in cylindrical openings
through each of the hanging arms; and the fluted roller turns on
pins passing through eyes in the lower ends of these rods. A Screw
is placed over the springs in the head of the frame, for regulating
the pressure on them. Slots are left in the hanging arms at top
& bottom for allowing the springs to act, and the fluted roller
to rise and fall. The hanging arms are united together by a round crop bar which serves as a handle. A loose cover is put over the whole box. .................. Operation ..................

The water, clothes, and soap, being put into the box, the clothes after being soaped & wetted, are put upon the ribbed or fluted board. the swinging frame with the ribbed or fluted roller is brought up the wash board, this pushes the water forward and forces it through the clothes, thus washing or extracting the dirt out of them..... When the clothes are washed the water is drawn off by a plug at the bottom of the box. This machine may be used for washing wool. Straw, and bristles, or any other soft pliable substance.

The invention here claimed & desired to be secured by Letters Patent, is the before described machine for washing clothes, wool, Straw, Bristles or any other soft, pliable substance requiring care, particularly the manner of suspending the fluted roller, & regulating the same by the rods in the hanging arms, Spiral Spring and regulating screw, so as to give any degree of pressure on the substance to be washed which may be required. For a farther illustration of my invention I refer to the model and drawing of the same deposited in the Patent Office.

In testimony whereof I have hereunto subscribed my name at the City of Washington this 16th day of April 1832.

Witnessed
Wm P Elliot
Saml P. Walker

Benton P. Coston

Exd.
[illegible]

(Patented the 27th Apl 1832)